(12) United States Patent
Sander

(10) Patent No.: US 12,742,461 B2
(45) Date of Patent: Sep. 22, 2026

(54) CANTILEVER BUTTERFLY SHUTTER DOOR CLOSER

(71) Applicant: The GSI Group, LLC, Assumption, IL (US)

(72) Inventor: Joshua Sander, Assumption, IL (US)

(73) Assignee: The GSI Group, LLC, Assumption, IL (US)

( * ) Notice: Subject to any disclaimer, the term of this patent is extended or adjusted under 35 U.S.C. 154(b) by 0 days.

(21) Appl. No.: 19/061,568

(22) Filed: Feb. 24, 2025

(65) Prior Publication Data

US 2025/0271001 A1 Aug. 28, 2025

Related U.S. Application Data

(60) Provisional application No. 63/557,869, filed on Feb. 26, 2024.

(51) Int. Cl.

| | |
|---|---|
| ***F04D 29/56*** | (2006.01) |
| ***A01K 1/00*** | (2006.01) |
| ***E05F 1/10*** | (2006.01) |
| ***F04D 19/00*** | (2006.01) |

(52) U.S. Cl.

CPC .......... *F04D 29/563* (2013.01); *A01K 1/0058* (2013.01); *E05F 1/1066* (2013.01); *F04D 19/002* (2013.01); *E05Y 2201/624* (2013.01); *E05Y 2201/654* (2013.01); *E05Y 2900/146* (2013.01)

(58) Field of Classification Search

CPC .. A01K 1/0047; A01K 1/0052; A01K 1/0058; A01K 1/0064; F05D 25/14; F04D 19/002; F24F 7/13; F24F 13/1426; F24F 13/24; E05Y 2900/146

See application file for complete search history.

(56) References Cited

U.S. PATENT DOCUMENTS

| | | | | |
|---|---|---|---|---|
| 7,070,385 | B2 * | 7/2006 | Milana | F04D 25/14 454/351 |
| 2006/0286924 | A1 | 12/2006 | Milana | |
| 2021/0144951 | A1 * | 5/2021 | Shao | F24F 13/24 |

* cited by examiner

*Primary Examiner* — Nathaniel E Wiehe
*Assistant Examiner* — Maxime M Adjagbe
(74) *Attorney, Agent, or Firm* — Ray Quinney & Nebeker

(57) ABSTRACT

A closing assembly for a butterfly shutter is biased to move a shutter door to a closed position. The closing assembly has a cable connecting to the shutter door, a spring, a bracket having a pivot arm and a spring mount arm extending from the pivot arm. The closing assembly has an asymmetric crank, where the spring is attached to a first portion of the asymmetric crank, a second portion of the asymmetric crank is attached to the pivot arm to form a pivot and a third portion receives the cable such that the spring pulls on the shutter door through the asymmetric crank and the cable. The shape of the spring mount arm and of the asymmetric crank are such that the acting pull force on the shutter door produced by the spring is higher when the shutter door is in the closed position.

17 Claims, 6 Drawing Sheets

124
208
202
206
216
212
214
306
218
302
210

501
124
516
512
510
509
514
518
515
502
504
506
508

CANTILEVER BUTTERFLY SHUTTER DOOR CLOSER

CROSS-REFERENCE TO RELATED APPLICATION

This application claims the benefit under 35 U.S.C. § 119(e) of U.S. Provisional Patent Application No. 63/557,869, filed on Feb. 26, 2024, which is hereby incorporated herein in its entirety by this reference.

TECHNICAL FIELD

Embodiments of the disclosure relate to shutters in ventilation systems for animal buildings, and more particularly to a closing assembly for a butterfly shutter.

BACKGROUND

Achieving optimal performance from animals raised in commercial animal house buildings (such as a poultry house) depends in part on providing ventilation as correctly and efficiently as possible. Proper ventilation improves overall over air quality, air temperature, and energy usage. Improper ventilation levels can lead to incorrect moisture levels, unsuitable temperatures, and poor air quality.

Ventilation fans are often used as part of the ventilation system for animal houses. The ventilation fans are used in conjunction with shutters that are able to open and close an air duct associated with the fan. One type of shutter commonly used is a butterfly shutter. Typically, butterfly shutters use the airflow generated by the fan to open the shutter when the fan is started. When the fan stops, the butterfly shutters need to be self-closing. Currently this is typically done with a spring that is attached between the door and a fixed point.

The problem with using this kind of spring is that the force applied by the spring is lowest when the shutter door is closed and highest when the shutter door is completely open. The low force at closing means sometimes there is not enough force to completely close the shutter door. This leads to leakage of air and light past the shutter door, which can be detrimental to the environment in the animal house. The high spring force when the shutter door is fully open leads to inefficiency in the fan performance because extra air pressure is needed to overcome the spring force and hold the shutter door in the open position.

Accordingly, a need exists for a ventilation fan assembly that allows for better control the operation of the butterfly shutter door.

BRIEF SUMMARY

In one aspect, a butterfly fan assembly has a propeller to generate an airflow through a sidewall opening in an animal house and a butterfly shutter configured to move between an open condition when the propeller is operating to allow passage of the airflow and a closed condition when the propeller is not producing an airflow so as to prevent air and light from passing through the sidewall opening. The butterfly shutter has a closing assembly that is biased to move a shutter door of the butterfly shutter from an open position to a closed position. The closing assembly includes a cable connected to the shutter door, a spring, a bracket having an elongate pivot arm and a spring mount arm extending from a first end of the pivot arm, where the spring mount arm receives a proximal end of the spring. The closing assembly has an asymmetric crank, where a distal end of the spring is attached to a first portion of the asymmetric crank, a second portion of the asymmetric crank is attached to a second end of the pivot arm of the bracket to form a pivot about which the asymmetric crank is able to pivot, and a third portion of the asymmetric crank receives one end of the cable. The spring provides an acting pull force on the shutter door through the asymmetric crank and the cable, where shapes of the shape of the spring mount arm and the asymmetric crank are such that the acting pull force on the shutter door produced by the spring is higher when the shutter door is in the closed position than when the shutter door is in the open position.

In one embodiment, a butterfly fan assembly having a propeller to generate an airflow through a sidewall opening in an animal house and a butterfly shutter configured to move between an open condition when the propeller is operating to allow passage of the airflow and a closed condition when the propeller is not producing the airflow, the butterfly shutter having a closing assembly that is biased to move a shutter door of the butterfly shutter from an open position to a closed position, the closing assembly comprising a cable, a spring, a bracket having an elongate pivot arm, the bracket configured to receive a first end of the spring at a first end of the elongate pivot arm, and an asymmetric crank. A second end of the spring is attached to a first portion of the asymmetric crank, a second portion of the asymmetric crank is attached to a second end of the bracket to form a pivot about which the asymmetric crank is configured to pivot, and a third portion of the asymmetric crank receives a second end of the cable, wherein the spring provides an acting pull force on the shutter door through the asymmetric crank and the cable.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiment.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
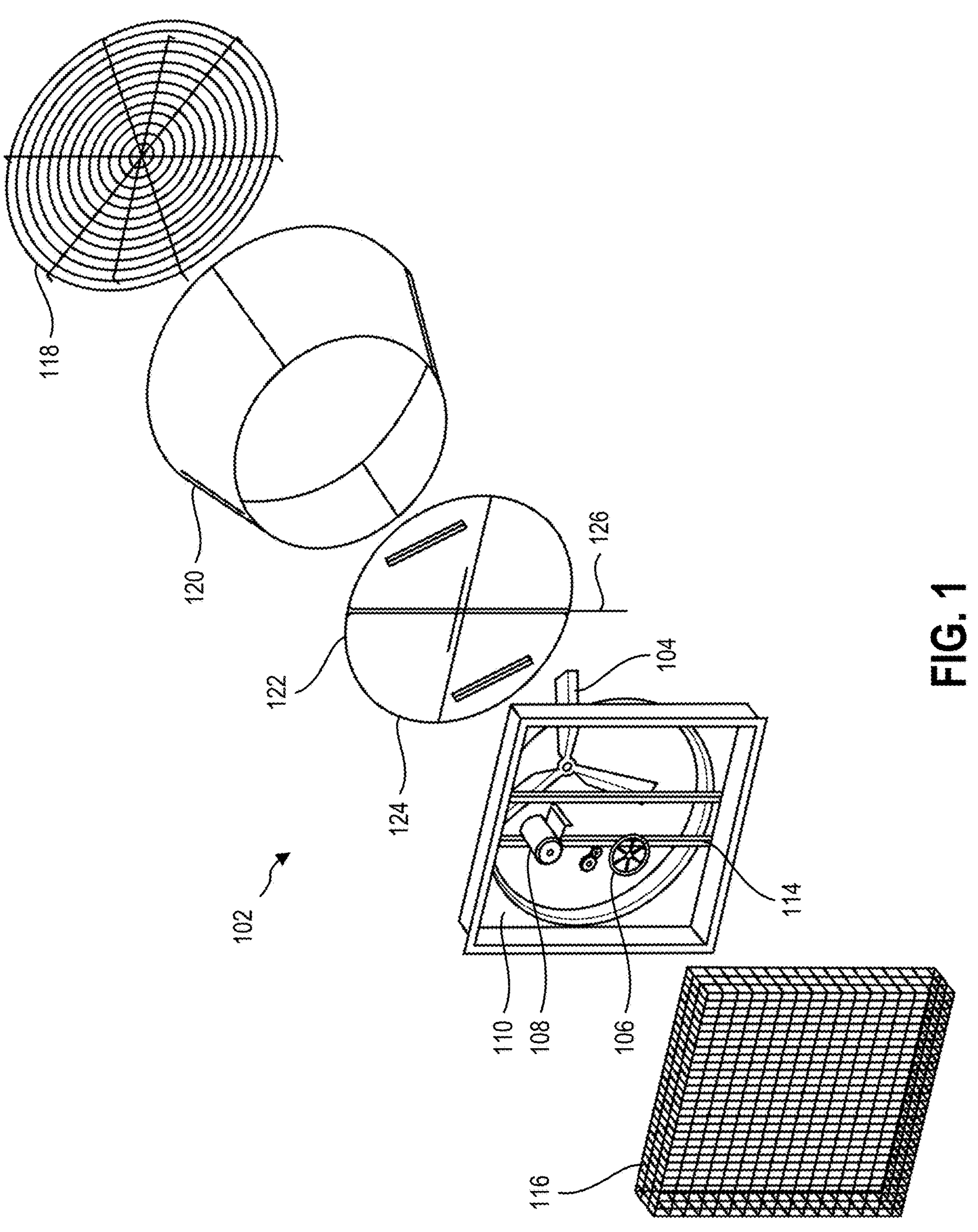
FIG. 1 is an exploded view of a fan assembly having a butterfly shutter according to an embodiment of the invention.

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience and are determined by standing at the rear of the machine facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

As used herein, the singular forms following "a," "an," and "the" are intended to include the plural forms as well, unless the context clearly indicates otherwise. As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded. As used herein, the term "configured" refers to a size, shape, material composition, and arrangement of one or more of at least one structure and at least one apparatus facilitating operation of one or more of the structure and the apparatus in a predetermined way.

As used herein, any relational term, such as "first," "second," "top," "bottom," "upper," "lower," "above," "beneath," "side," etc., is used for clarity and convenience in understanding the disclosure and accompanying drawings, and does not connote or depend on any specific preference or order, except where the context clearly indicates otherwise.

As used herein, the term "about" used in reference to a given parameter is inclusive of the stated value and has the meaning dictated by the context (e.g., it includes the degree of error associated with measurement of the given parameter, as well as variations resulting from manufacturing tolerances, etc.). As used herein, the term "substantially" in reference to a given parameter, property, or condition means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

FIG. 1 illustrates a butterfly fan assembly 102 such as one installed in a portion of a sidewall of an animal house. As is known in the art, butterfly fan assemblies 102 are used as part of an overall ventilation system for the animal houses to enable adequate and efficient airflow and circulation within the animal house. The butterfly fan assembly 102 comprises a propeller 104 having a fan shaft attached to a pulley 106 which is rotated by a suitable motor 108 operably coupled to the pulley 106. The propeller 104 is mounted within a fan venturi 110 enclosed in frame 112. One or more cross braces 114 extend between the frame 112 to position the propeller 104 within the fan venturi 110. The butterfly fan assembly 102 has an inlet grill 116 and an outlet guard 118 to prevent access to the rotating propeller 104 during operation of the butterfly fan assembly 102. Airflow generated by the butterfly fan assembly 102 is directed by a cone 120 mounted around an opening in the sidewall to allow airflow through the sidewall from the animal house. These components of the butterfly fan assembly 102 may be of any suitable design.

A butterfly shutter 122 is installed in the cone 120 that is configured to move between an open condition when the butterfly fan assembly 102 is operating to force air through the opening and a closed condition when the butterfly fan assembly 102 is off to prevent (e.g., substantially prevent, reduce) air and light from passing through the sidewall opening. The butterfly shutter 122 has a pair of shutter doors 124 each configured to pivot about a central shutter door axis 126 between open and closed positions.

Figure 2:
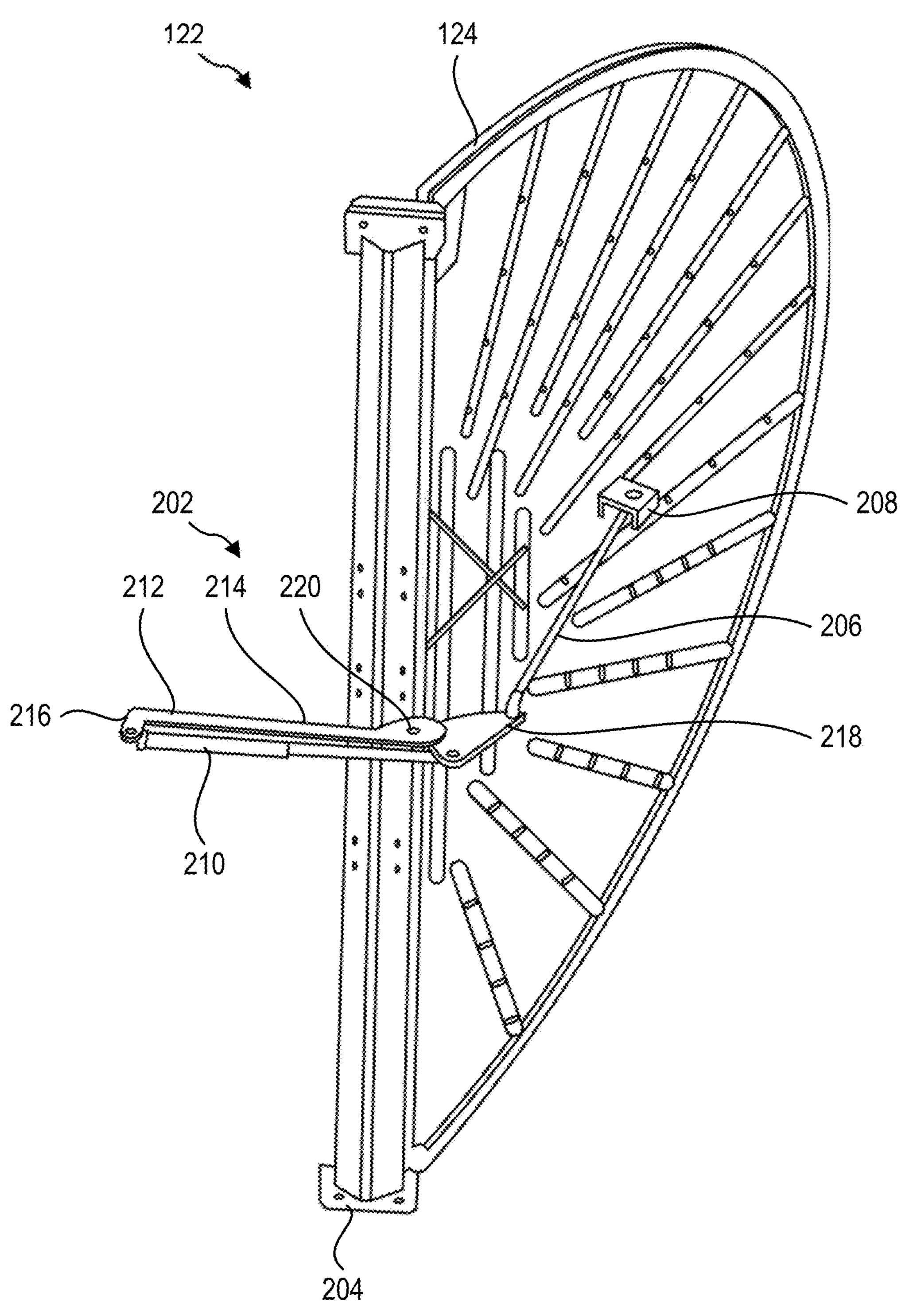
FIG. 2 illustrates a perspective view of a closing assembly for a butterfly shutter of FIG. 1, according to at least one embodiment of the disclosure.

FIG. 2 is a simplified perspective view of a closing assembly for the butterfly shutter 122, according to at least one embodiment of the disclosure. According to embodiments described herein, the butterfly shutter 122 has a closing assembly 202 that is biased to move the shutter door 124 from the open position to the closed position on a door hinge 204 when the propeller 104 is not rotating and moving air through the butterfly fan assembly 102. Although only one shutter door 124 and closing assembly 202 is shown in FIG. 2, a similar closing assembly 202 is used with the other shutter door 124 of the butterfly shutter 122. In other words, the butterfly fan assembly 102 may include two closing assemblies 202, each closing assembly 202 including a butterfly shutter 122 and shutter door 124. The closing assembly 202 assembly has a cable 206 that mounts to the shutter door 124 with a shutter mount 208 that is used to pull the shutter door 124 into the closed position. In some embodiments, the shutter mount 208 is coupled to the shutter door 124 proximate the periphery of the shutter door 124. However, the disclosure is not so limited, and the shutter mount 208 may be coupled to the shutter door 124 at any location so long as an applied force or tension on the shutter mount 208 (e.g., but a spring 210) can be used to open or close the shutter door 124. A spring 210 of the closing assembly 202 is attached to an elongated bracket 212 mounted on the frame 112 of the butterfly fan assembly 102. In the illustrated embodiment, the elongated bracket 212 has a cantilevered pivot arm 214 (also referred to as an "elongate pivot arm") with a spring mount arm 216 extending from a first end thereof. The bracket 212 pivotally receives an asymmetric crank 218 on which the cable 206 is mounted.

Figure 3:
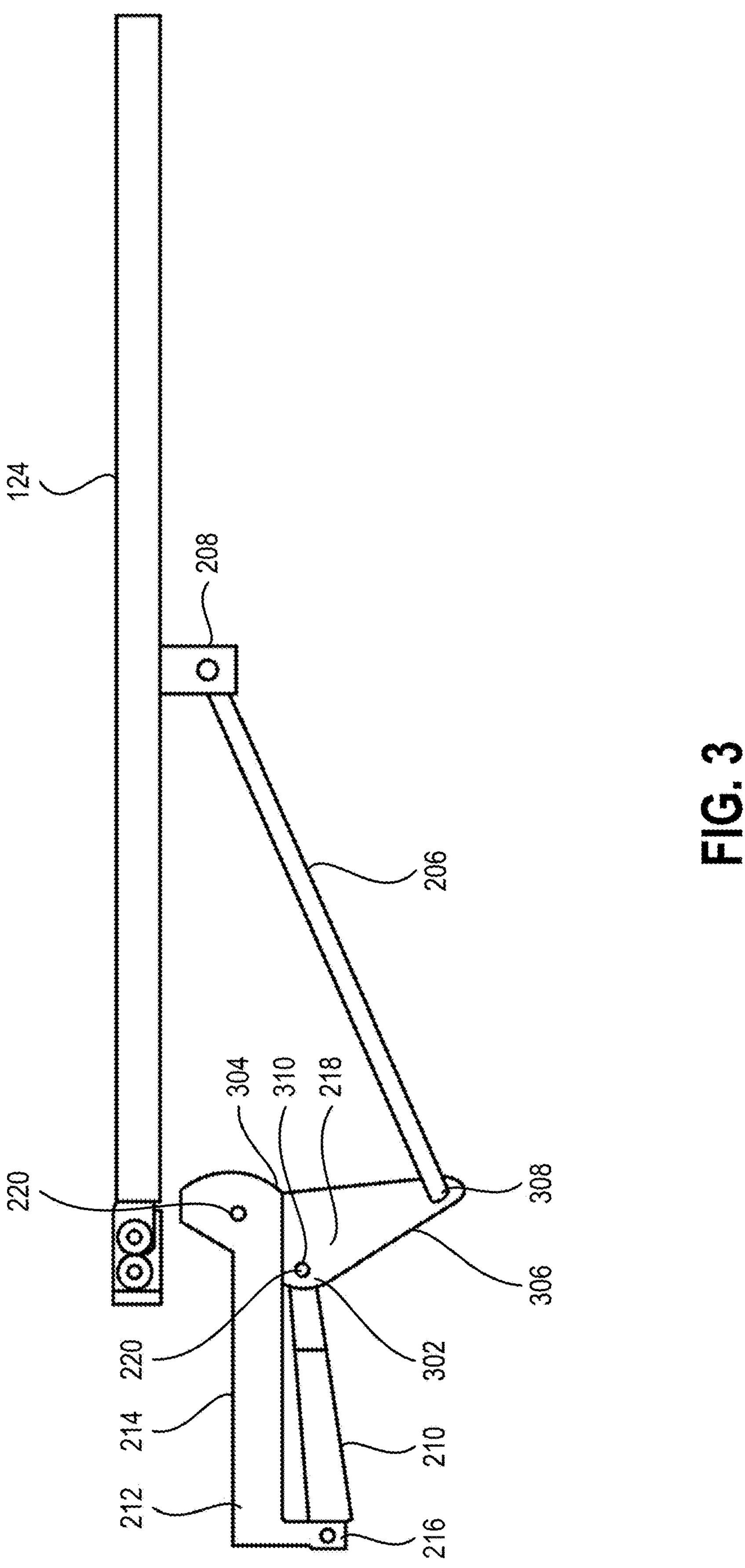
FIG. 3 illustrates the closing assembly of FIG. 2 with the butterfly shutter in a closed position, according to at least one embodiment of the disclosure.
Figure 4:
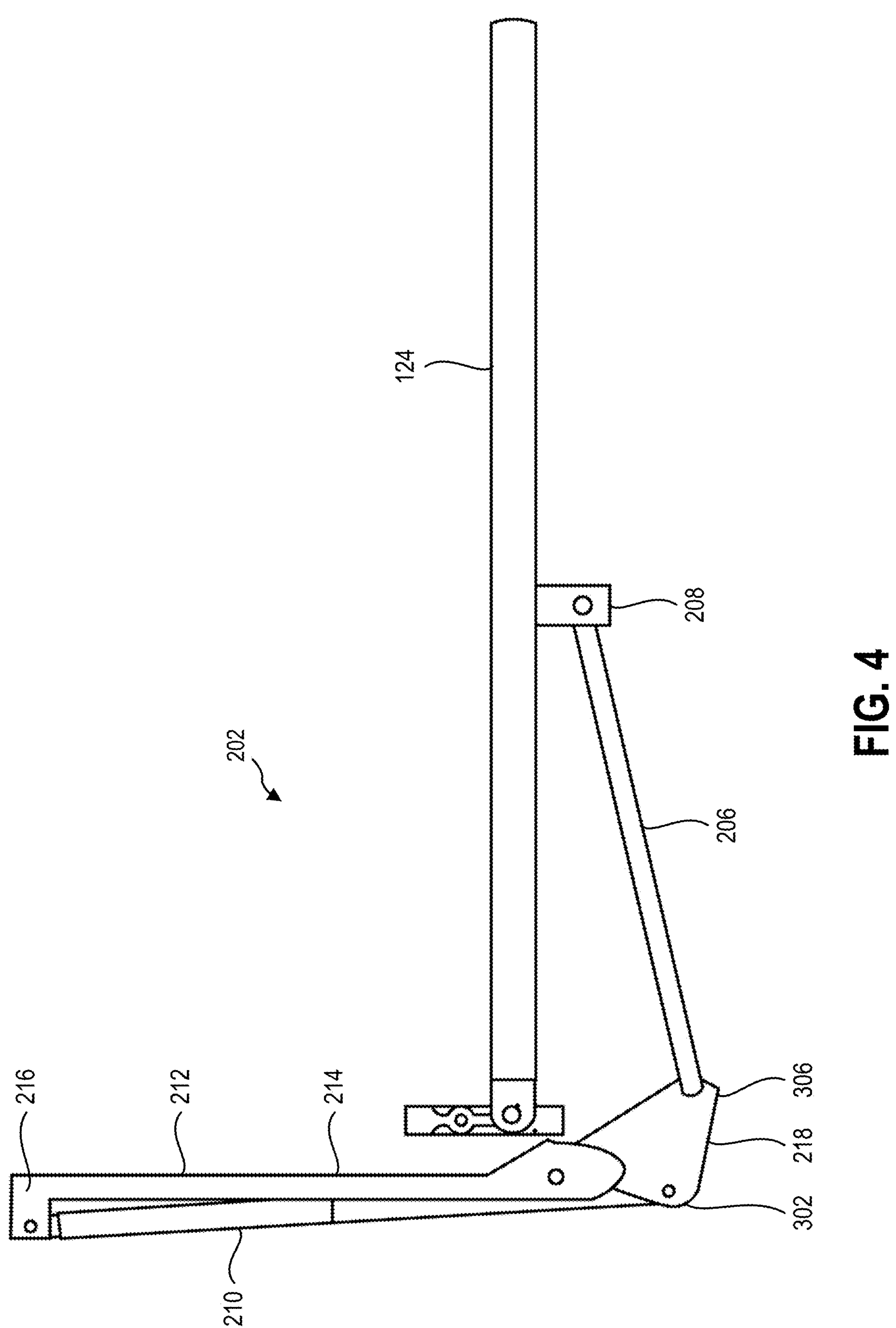
FIG. 4 illustrates the closing assembly of FIG. 2 with the butterfly shutter in an open position, according to at least one embodiment of the disclosure.

Turning also now to FIGS. 3 and 4, the spring mount arm 216 receives a proximal end of the spring 210. In the illustrated embodiment, a distal end of the spring 210 is attached to a first portion 302 of the asymmetric crank 218 at spring connection 310. A second portion 304 of the asymmetric crank 218 is attached to a second end of the pivot arm 214 of the bracket 212 to form a pivot 220 about which the asymmetric crank 218 is able to pivot. A third portion 306 of the asymmetric crank 218 receives one end of the cable 206 at cable connection 308. The cable 206 may extend from the shutter door 124 (e.g., the shutter mount 208) and the third portion 206.

In the illustrated embodiment, the spring 210 pulls on the shutter door 124 through the asymmetric crank 218 and the cable 206. Because of the shape of the asymmetric crank 218 and the spring mount arm 216, the acting pull force produced by the spring 210 on the shutter door 124 is not uniform throughout the pivoting motion of the shutter door 124. The spring force produced by the spring 210 and applied to the shutter door 124 via the asymmetric crack 218, the cable 206, and the shutter mount 208 varies based on the displacement of the spring 210. In the illustrated embodiment, the spring 210 is displaced a greater amount and thus has a greater spring force when the shutter door 124 is in the open position (FIG. 4) compared to when the shutter door 124 is in the open position (FIG. 3). The pull force vector is measured between the fixed mount point of the proximal end of the spring 210 on the spring mount arm 216 and through the mount point of the spring 210 on the first portion 302 of the asymmetric crank 218. The pull force radius vector is the distance from the pivot 220 to that vector.

In some embodiments, the asymmetric crack 218 exhibits a triangular shape. However, the disclosure is not so limited, and the shale of the asymmetric crank 218 may be different. For example, the asymmetric crack 218 may be rectangular, square, circular, oval, or another shape. In some embodiments, the connection between the cable connection 308 and the asymmetric crack 218 (e.g., the third portion 306) may be located farther from the connection between the asymmetric crank 218 and the spring 210 (e.g., the first portion 2108). In some embodiments, a distance between the second portion 304 (the pivot 220) and the third portion 304 is greater than a distance between the second portion 304 and the first portion 302. As such, extension and retraction of the spring 210 may move the relative position between the third portion 306 and the shutter door 124 more than the relative position between the first portion 302 and the shutter door 114.

The shape of the spring mount arm 216 and the shape of the asymmetric crank 218 and the connection points for the spring 210 and the cable 206 relative to the pivot 220 are such that the acting pull force on the shutter door 124 produced by the spring 210 is higher when the shutter door 124 is in the closed position as shown in FIG. 3. This desirably tightly holds the shutter door 124 in the closed (shut) condition so as to prevent or reduce leakage of air and light past the closed shutter doors 124. The shape of the of the spring mount arm 216 and the shape of the asymmetric crank 218 and the connection points for the spring 210 and the cable 206 relative to the pivot 220 are such that the acting pull force on the shutter door 124 produced by the spring 210 is lower when the shutter door 124 is in the open position as shown in FIG. 4. This desirably improves efficiency of the butterfly fan assembly 102 when it is desired to move air through the animal house.

Table 1 shows spring force, acting pull force and the pull force vector for one example embodiment for the shape of the spring mount arm 216 and the shape of the asymmetric crank 218 and the connection points for the spring 210 and the cable 206 relative to the pivot 220.

TABLE 1

| | Door Closed | Door Open |
|---|---|---|
| Pull force vector radius to pivot (inch) | 1 | 0.125 |
| Spring force (lbs) | 2 | 5 |
| Acting pull force (in-lbs) | 2 | 0.625 |

Thus, with reference to Table 1, the pull force acting on the shutter door 124 when the shutter door 124 is closed is higher than the pull force acting on the shutter door 124 when the shutter door 124 is open. By way of comparison, conventional shutter doors that have springs may exhibit a lowest applied force to a shutter door when the shutter door is closing and a greater applied force to the shutter door when the shutter door is open or opening. The higher applied force on the shutter door when the shutter door is open leads in inefficient fan performance due to the required extra air pressure to hold the shutter door open. In addition, the low closing force results in inefficient or inadequate closing of the shutter doors. According to embodiments described herein, the mounting of the spring 210 to the spring mount arm 216, the shape of the asymmetric crank 218, and the connection points for the spring 210 and the cable 206 relative to the pivot 220 facilitate the application of a higher closing force than a force when the shutter door 124 is open, improving the operation of the butterfly fan assembly 102.

Although the butterfly fan assembly 102 has been described and illustrated as including the butterfly shutter 122 including the elongated bracket 212 mounted and coupled to the frame 112, and the cable 206 as mounting to the shutter door 124 (e.g., via the shutter mount 208), the disclosure is not so limited. In other embodiments, the butterfly fan assembly 102 includes a butterfly shutter wherein the elongated bracket is coupled to the shutter door 124 and the cable is mounted to the frame 112.

Figure 5:
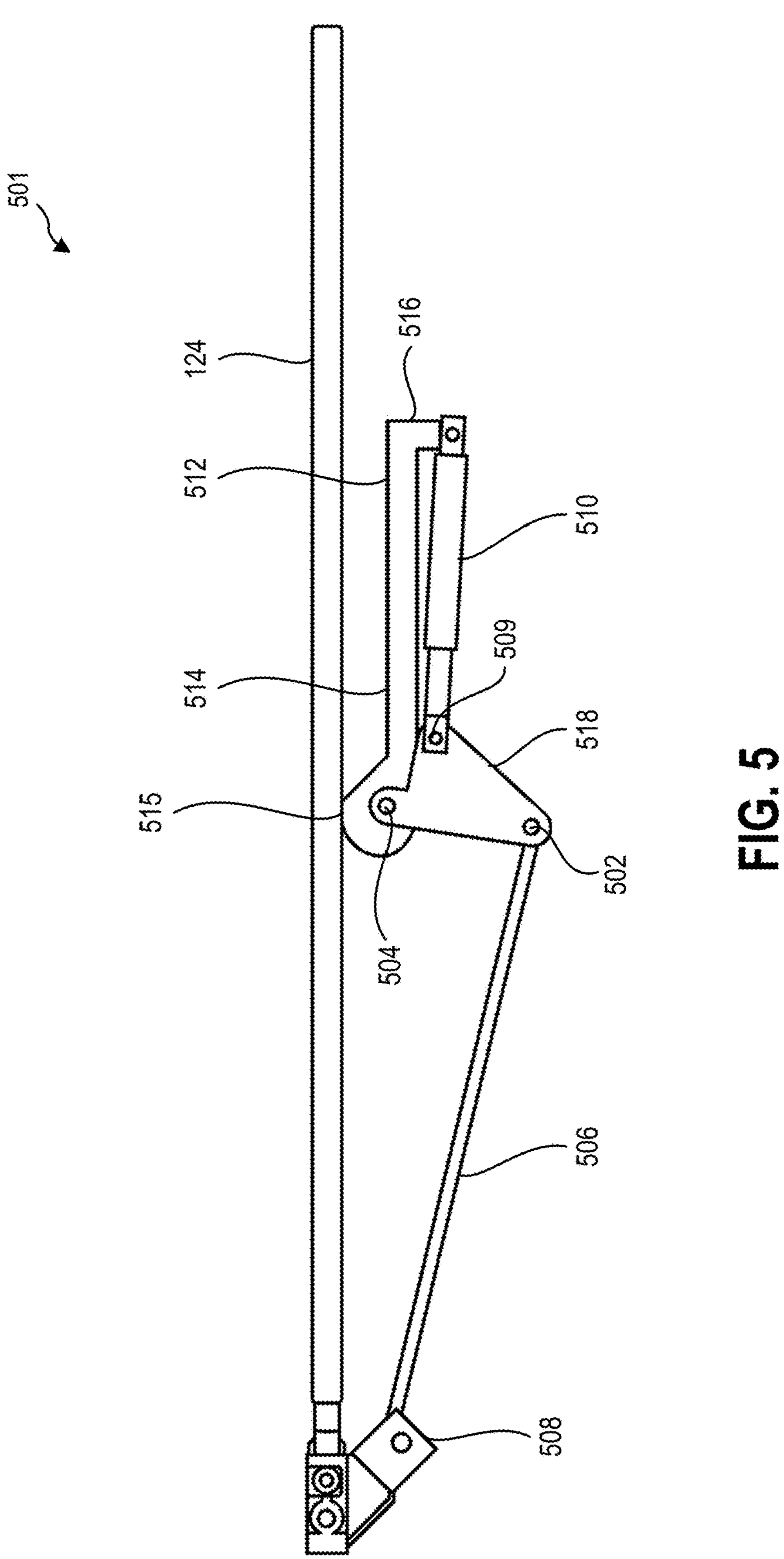
FIG. 5 illustrates the closing assembly of a butterfly shutter in an open position, according to at least one embodiment of the disclosure.
Figure 6:
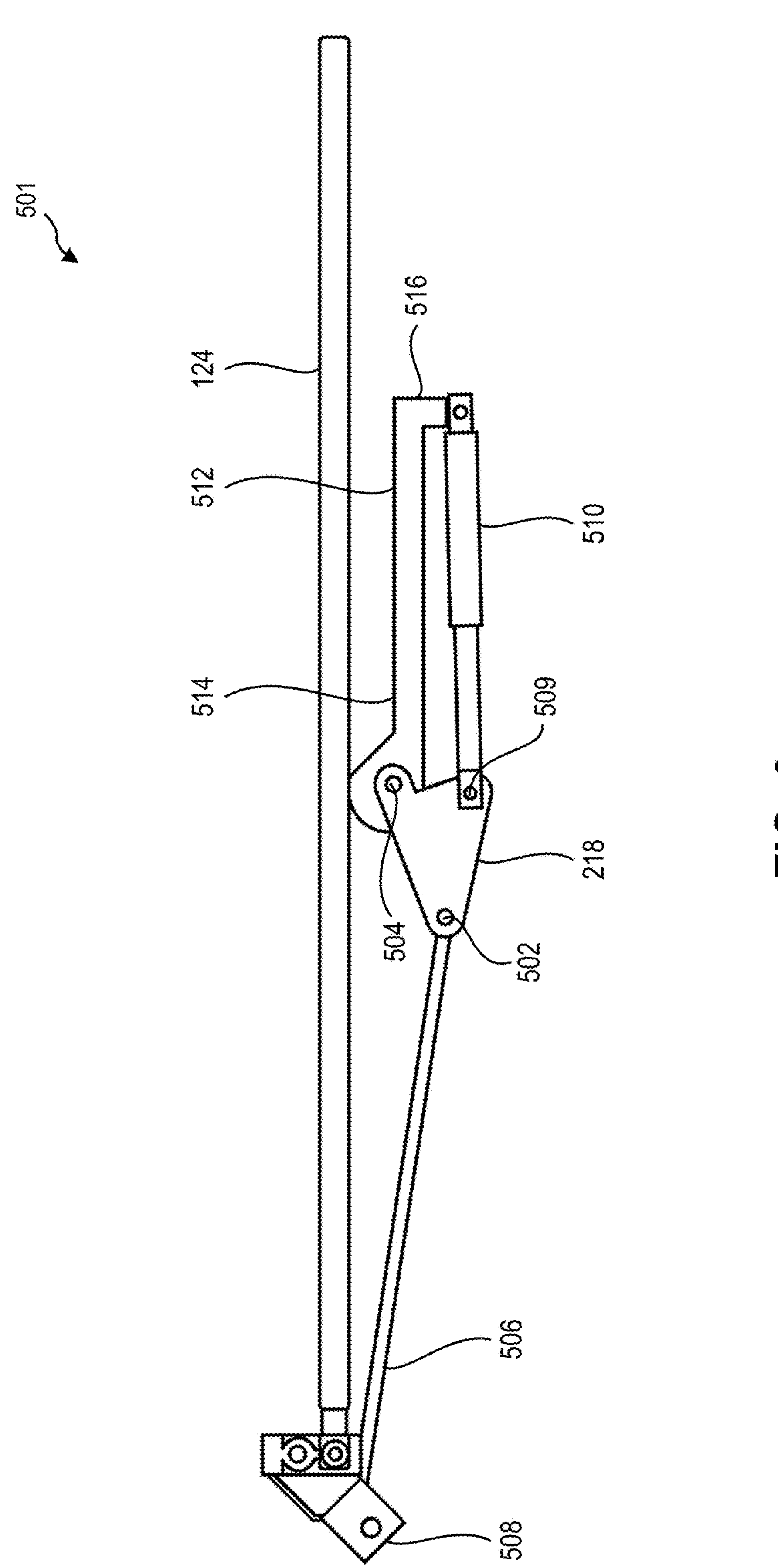
FIG. 6 illustrates the closing assembly of the butterfly shutter in a closed position, according to at least one embodiment of the disclosure.

FIG. 5 illustrates a closing assembly 501 of a butterfly shutter in an open position, according to at least one embodiment of the disclosure; and FIG. 6 illustrates the closing assembly 501 of the butterfly shutter in a closed position, according to at least one embodiment of the disclosure. Components of the butterfly shutter that are the same as or substantially similar to corresponding components of the butterfly shutter 122 described above retain the same numerical designation. With reference to FIG. 5 and FIG. 6, the butterfly shutter is substantially the same as the butterfly shutter 122 described above with reference to FIG. 2 through FIG. 4, except that the butterfly shutter includes a cable 506 that couples to the frame 112 (FIG. 1), rather than to the shutter door 124. In some embodiments, the cable 506 is coupled to a cable mount 508 that mounts to the frame 112 and/or to the shutter door 124.

An elongated bracket 512 may be coupled to the shutter door 124, such as at location 515. The elongated bracket 512 may include an elongated pivot arm 514 and a spring mount arm 516 coupled to the elongate pivot arm 514. The elongated bracket 512 is coupled to the cable 506 by an asymmetric crank 518. The cable 506 may extend between the cable mount 508 and a first portion of an asymmetric crank 518; and the elongated bracket 512 may include a first end connected to a second portion 504 of the asymmetric crank 518 and a second portion including the spring mount arm 516 coupled to a first end of a spring 510. The spring 510 may extend from the spring mount arm 516 at the first end and to the asymmetric crank 518 at a second end of the spring 510. The spring 510 may coupled to the asymmetric crank 518 at a third portion 509 of the asymmetric crank 518. In some embodiments, during opening and closing of the shutter door 124, the asymmetric crank 518 pivots (e.g., rotates) about the second portion 504. In some embodiments, extension and retraction of the spring 510 may alter the distance between the shutter door 124 and each of the first portion 502 and the second portion 509 of the asymmetric crank 518. The spring 510 may be configured to provide an acting pull force on the shutter door 124 through the asymmetric crank 518, the elongated bracket 512, and the cable 506.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

What is claimed is:

1. A butterfly fan assembly having a propeller to generate an airflow through a sidewall opening in an animal house and a butterfly shutter configured to move between an open condition when the propeller is operating to allow passage of the airflow and a closed condition when the propeller is not producing the airflow, the butterfly shutter having a closing assembly that is biased to move a shutter door of the butterfly shutter from an open position to a closed position, the closing assembly comprising:

a cable connected to the shutter door;

a spring;

a bracket having an elongate pivot arm and a spring mount arm extending from a first end of the elongate pivot arm, wherein the spring mount arm receives a proximal end of the spring; and an asymmetric crank, wherein a distal end of the spring is attached to a first portion of the asymmetric crank, a second portion of the asymmetric crank is attached to a second end of the elongate pivot arm of the bracket to form a pivot about which the asymmetric crank is configured to pivot and a third portion of the asymmetric crank receives one end of the cable, wherein the spring provides an acting pull force on the shutter door through the asymmetric crank and the cable;

wherein shapes of the spring mount arm and of the asymmetric crank are such that the acting pull force on the shutter door produced by the spring is higher when the shutter door is in the closed position than when the shutter door is in the open position.

2. The butterfly fan assembly of claim 1, wherein the shape of the asymmetric crank and the spring mount arm causes the acting pull force produced by the spring on the shutter door to be non-uniform throughout movement of the shutter door between the open position and the closed position.

3. The butterfly fan assembly of claim 1, wherein the cable is connected to the shutter door at a shutter mount.

4. The butterfly fan assembly of claim 1, wherein a distance between the third portion and the shutter door is greater than a distance between the first portion and the shutter door.

5. The butterfly fan assembly of claim 1, wherein butterfly fan assembly comprises two shutter doors.

6. The butterfly fan assembly of claim 1, wherein the cable extends from the shutter door and the third portion.

7. A butterfly fan assembly having a propeller to generate an airflow through a sidewall opening in an animal house and a butterfly shutter configured to move between an open condition when the propeller is operating to allow passage of the airflow and a closed condition when the propeller is not producing the airflow, the butterfly shutter having a closing assembly that is biased to move a shutter door of the butterfly shutter from an open position to a closed position, the closing assembly comprising:

a cable;

a spring;

a bracket having an elongate pivot arm, the bracket configured to receive a first end of the spring at a first end of the elongate pivot arm; and an asymmetric crank, wherein:

a second end of the spring is attached to a first portion of the asymmetric crank;

a second portion of the asymmetric crank is attached to a second end of the bracket to form a pivot about which the asymmetric crank is configured to pivot; and a third portion of the asymmetric crank receives a second end of the cable, wherein the spring provides an acting pull force on the shutter door through the asymmetric crank and the cable.

8. The butterfly fan assembly of claim 7, wherein the asymmetric crank has a triangular shape.

9. The butterfly fan assembly of claim 7, wherein a distance between the second portion and the third portion is greater than a distance between the second portion and the first portion.

10. The butterfly fan assembly of claim 7, wherein the spring is received at a spring arm amount of the bracket.

11. A butterfly fan assembly, comprising:

a propeller;

a butterfly shutter having a closing assembly that is biased to move a shutter door of the butterfly shutter from an open position to a closed position, the closing assembly comprising:

an elongated bracket coupled to the shutter door at a first end of the elongated bracket;

a spring coupled to a second end of the elongated bracket at a first end of the spring;

a cable attached to the shutter door at a first end of the cable; and an asymmetric crack, wherein:

the cable extends from the shutter door to a first portion of the asymmetric crank;

the first end of the elongated bracket is attached to a second portion of the asymmetric crank; and a second end of the spring is attached to a third portion of the asymmetric crank, the asymmetric crank configured to pivot about the second portion during opening and closing of the shutter door.

12. The butterfly fan assembly of claim 11, wherein the asymmetric crank has a triangular shape.

13. The butterfly fan assembly of claim 11, wherein a distance between the second portion and the third portion is greater than a distance between the second portion and the first portion.

14. The butterfly fan assembly of claim 11, wherein the spring is received at a spring arm amount of the elongated bracket.

15. The butterfly fan assembly of claim 1, wherein the asymmetric crank has a triangular shape.

16. The butterfly fan assembly of claim 1, wherein a distance between the second portion and the third portion is greater than a distance between the second portion and the first portion.

17. The butterfly fan assembly of claim 1, wherein the bracket is attached to a frame of the butterfly fan assembly.

* * * * *